United States Patent [19]

Sarangdhar et al.

[11] Patent Number: 5,551,005

[45] Date of Patent: Aug. 27, 1996

[54] APPARATUS AND METHOD OF HANDLING RACE CONDITIONS IN MESI-BASED MULTIPROCESSOR SYSTEM WITH PRIVATE CACHES

[75] Inventors: Nitin V. Sarangdhar, Beaverton; Wen-Hann Wang, Portland; Matthew Fisch, Beaverton, all of Oreg.

[73] Assignee: Intel Corporation, Santa Clara, Calif.

[21] Appl. No.: 201,854

[22] Filed: Feb. 25, 1994

[51] Int. Cl.$^6$ ............................................. G06F 12/08
[52] U.S. Cl. ..................... 395/472; 395/471; 395/473; 395/467; 395/448; 395/469; 364/DIG. 1; 364/231.8; 364/243.44
[58] Field of Search ........................... 364/200 MS File, 364/900 MS File; 395/200, 425, 450, 403, 471, 472, 473, 448, 467, 550, 200.08, 469

[56] References Cited

U.S. PATENT DOCUMENTS

| | | | |
|---|---|---|---|
| 4,755,930 | 7/1988 | Wilson, Jr. et al. | 395/449 |
| 5,297,269 | 3/1994 | Donaldson et al. | 395/472 |
| 5,303,362 | 4/1994 | Butts, Jr. et al. | 395/448 |
| 5,335,335 | 8/1994 | Jackson et al. | 395/448 |

*Primary Examiner*—Matthew M. Kim
*Attorney, Agent, or Firm*—Blakely, Sokoloff, Taylor & Zafman

[57] ABSTRACT

In a computer system having a plurality of processors with internal caches, a method for handling race conditions arising when multiple processors simultaneously write to a particular cache line. Initially, a determination is made as to whether the cache line is in an exclusive, modified, invalid, or shared state. If the cache line is in either the exclusive or modified state, the cache line is written to and then set to the modified state. If the cache line is in the invalid state, a Bus-Read-Invalidate operation is performed. However, if the cache line is in the shared state and multiple processors initiate Bus-Write-Invalidate operations, the invalidation request belonging to the first processor is allowed to complete. Thereupon, the cache line is sent to the exclusive state, data is updated, and the cache line is set to the modified state. The second processor receives a second cache line, updates this second cache line, and sets the second cache line to the modified state.

22 Claims, 9 Drawing Sheets

APPARATUS AND METHOD OF HANDLING RACE CONDITIONS IN MESI-BASED MULTIPROCESSOR SYSTEM WITH PRIVATE CACHES

FIELD OF THE INVENTION

The present invention relates to the field of computer systems having multiple processors. More specifically, the present invention pertains to an apparatus and method for handling race conditions in a multi-processor system.

BACKGROUND OF THE INVENTION

A computer system can be broken into three basic blocks: a central processing unit (CPU), memory, and input/output (I/O) units. These blocks are interconnected by means of a bus. An input device such as a keyboard, mouse, disk drive, analog-to-digital converter, etc., is used to input instructions and data to the computer system via the I/O unit. These instructions and data can be stored in memory. The CPU retrieves the data stored in the memory and processes the data as directed by the stored instructions. The results can be stored back into memory or outputted via the I/O unit to an output device such as a printer, cathode-ray tube (CRT) display, digital-to-analog converter, LCD, etc.

In one instance, the CPU consisted of a single semiconductor chip known as a microprocessor. This microprocessor executed the programs stored in the main memory by fetching their instructions, examining them, and then executing them one after another. Due to rapid advances in semiconductor technology, faster, more powerful and flexible microprocessors were developed to meet the demands imposed by ever more sophisticated and complex software.

In some applications multiple processors are utilized. A singularly complex task can be broken into sub-tasks. Each sub-task is processed individually by a separate processor. For example, in a multiprocessor computer system, word processing can be performed as follows. One processor can be used to handle the background task of printing a document, while a different processor handles the foreground task of interfacing with a user typing on another document. Thereby, both tasks are handled in a fast, efficient manner. This use of multiple processors allows various tasks or functions to be handled by other than a single CPU so that the computing power of the overall system is enhanced. And depending on the complexity of a particular job, additional processors may be added. Furthermore, utilizing multiple processors has the added advantage that two or more processors may share the same data stored within the system.

These processors often contain a small mount of dedicated memory, known as a cache. Caches are used to increase the speed of operation. In a processor having a cache, as information is called from main memory and used, it is also stored, along with its address, in a small portion of especially fast memory, usually in static random access memory (SRAM). As each new read or write command is issued, the system looks to the fast SRAM (cache) to see if the information exists. A comparison of the desired address and the addresses in the cache memory is made. If an address in the cache memory matches the address sought, then there is a hit (i.e., the information is available in the cache). The information is then accessed in the cache so that access to main memory is not required. Thereby, the command is processed much more rapidly. If the information is not available in the cache, the new data is copied from the main memory and stored in the cache for future use.

Because these caches are typically localized, these multiple memory elements in a multiprocessor computer system can (and usually do) contain multiple copies of a given data item. It is important that any processor or other agent accessing any copy of this data receives a valid data value. In other words, cache coherency in hardware must be maintained. One way to implement cache coherency involves having all caches "snoop" the memory bus traffic. Snooping refers to the act of monitoring data and address traffic for values of interest. If a processor writes memory for an address that is in the local cache, that cache will have been snooping the memory bus and will notice that it now has a stale copy of that data. That cache entry will then be invalidated. The next time that cache entry is accessed, instead of retrieving outdated data, it will incur a cache miss, and the new data will be forwarded from memory.

However, a problem could potentially arise when multiple writeback processors perform write transactions to the same cache line. If all of the processors perform a write-through, two or more copies of the line containing different data can exist in their internal caches. Only the data in the main memory contains the valid data. Hence, the cache lines within their respective caches must be invalidated.

The other option available for writeback processors is using a write allocate policy to obtain the exclusive ownership of the cache line prior to updating the data. Thus a processor in Shared state will issue a Bus Write Invalidate Line operation to invalidate other caches and make a state transition to Exclusive state. This is followed by the actual data update and a state transition to Modified State.

However, this approach also creates an opportunity for race condition amongst two processors that may simultaneously try to make a transition from Shared State to Exclusive State. Clearly, only one processor could be allowed to successfully complete the transition. One prior art method for resolving this race condition involved giving a negative acknowledgment (NACK) response to the second processor. However, the disadvantage with this approach is that it fails to address the issue of temporary live-lock scenarios. A live-lock scenario might occur when the same processor gets NACKed multiple times over in its attempt in getting ownership of the cache line. This may cause a temporary stall and lack of forward program. The possibility of the processor stalling increases as more processors are added and share the same bus. Clearly, from a performance standpoint, this is a highly undesirable situation.

Thus, there is a need in the prior art for a mechanism for resolving race conditions attributed to multiple processors writing to the same cache line. It would be preferable if such a mechanism could eliminate live-lock situations while providing a simple, uniform process to maintain cache coherency in a multi-cluster system environment. It would also be preferable if such a mechanism allows for the use of a deeply pipelined bus in a single cluster containing multiple processors. Furthermore, it would be beneficial if such a mechanism allocates cache lines on a write-miss condition.

SUMMARY OF THE INVENTION

The present invention pertains to an apparatus and method for handling race conditions in a multi-processor system. In the present invention, when a processor writes to a cache line, it may write to that line immediately, provided that the line is in either the Exclusive or Modified state. Afterwards, the final state of that line is changed to the Modified state. Whenever the processor writes to a line in the Invalid or Shared state, it has two options to deal with the operation. In a write-through approach, a write miss creates a partial write transaction from the agent writing the data. If the processor contains the data in an Invalid state, caches are not affected. When the transaction runs on the bus, all snooping caches are invalidated. If the processor contains the data in the Shared state, a cache write-through operation is performed, and the partial write transaction is sent on the bus. The partial write invalidates the line in other snooping caches. On completion of the transaction, the original agent goes to the Exclusive state and subsequently begins updating the cache internally. If multiple writeback agents perform a write transaction to the same cache line, only the data in main memory contains valid data. Hence, the lines inside all caches are invalidated.

In a write-allocation approach, whenever the line is in the Invalid state, a Bus-Read-Invalidate transaction is performed. This transaction invalidates the cache line in all other caches and brings the line back to the Exclusive state in the requesting processor. Whenever the line is in the Shared state, a Bus-Write-Invalidate transaction is performed. This transaction invalidates the cache line in all other caches and allows the Shared state to transition to Exclusive state in the requesting processor. Only after the Exclusive state transition has occurred, is a processor allowed to update its cache data and upgrade itself to the Modified state.

Note that since the data update does not happen until the processor is in the Exclusive state, it is assured that only one processor will be updating the cache data at any time. When two processors on the same cluster initiate a Bus-Write-Invalidate operation at the same time, it is necessary to resolve the race condition. In the currently preferred embodiment, the approach taken allows a live-lock free resolution of the race condition. In this approach, both invalidation requests are allowed to continue on the bus. The invalidation request that first appeared on the bus completes normally. The first agent goes to the Exclusive state, updates data, and then goes to the Modified state. On observing the second invalidation request, the first processor asserts the snoop results indicating that it contains the line in Modified state. It returns the new line using the implicit writeback cache line writeback and then goes to the Invalid state. The second processor which normally expects just a completion response to a bus-invalidation request, now receives a new cache line. It updates the cache to the new cache line and then goes; to the Exclusive state. Now it can write its data to the Exclusive state line and change it to that of the Modified state. The same approach can be applied if all processors generated invalidation requests on the same bus cluster. The ownership of the cache line is passed from one processor to the next.

Furthermore, the same approach is extendible to multiple clusters, each of them containing writeback caches. It is possible for two or more processors from different clusters to initiate Bus-Write-Invalidation requests to the same cache line. In such cases, the memory controllers in both clusters assert a snoop result indicating that the ownership of the line is not immediately available. Next, the memory controllers will access the system interconnect network (normally a common bus but may have a different topology). By definition one of them will succeed first. This allows the first transaction to be ready for completion. The first memory controller informs the first processor by running a deferred reply with normal completion response. This allows the first processor to upgrade to the Exclusive state, update its cache line, and then go to the Modified state.

When the second memory controller issues its request to the system bus, the request is handled in the presence of a Modified state line in the first cluster. As a result, a backward invalidation is sent to the first cluster/processor to invalidate the line from the processor and obtain the writeback cache line. This line now contains the updated data. Next, a deferred reply is sent back by the second memory controller to the second processor. During the data phase of the deferred reply, the memory controller returns the new cache line. When the processor obtains a deferred reply with data, it absorbs the newly modified cache line in its cache and goes to the Exclusive state. Now it updates the cache line and changes it to the Modified state. Note that since there was no need to NACK any transaction, there is no possibility of repeated retries and, hence, no resulting live-lock scenarios.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for handling race conditions in a multi-processor system is described in detail below. In the following description for purposes of explanation, specific details such as processor configurations, components, bus hierarchies, etc. are set forth in order to provide a thorough understanding of the present invention. However, it will be apparent to one skilled in the art that the present invention may be practiced without these specific details. In other instances, well known structures, devices, functions, and procedures are shown in block diagram form in order not to avoid obscuring the present invention. It should be noted that the present invention can be applied to a variety of different processor architectures. Furthermore, the present invention can be practiced in a variety of manners, such as by a single or multiple chip implementation or by fabrication by silicon or gallium arsenide or other processes.

Figure 1:
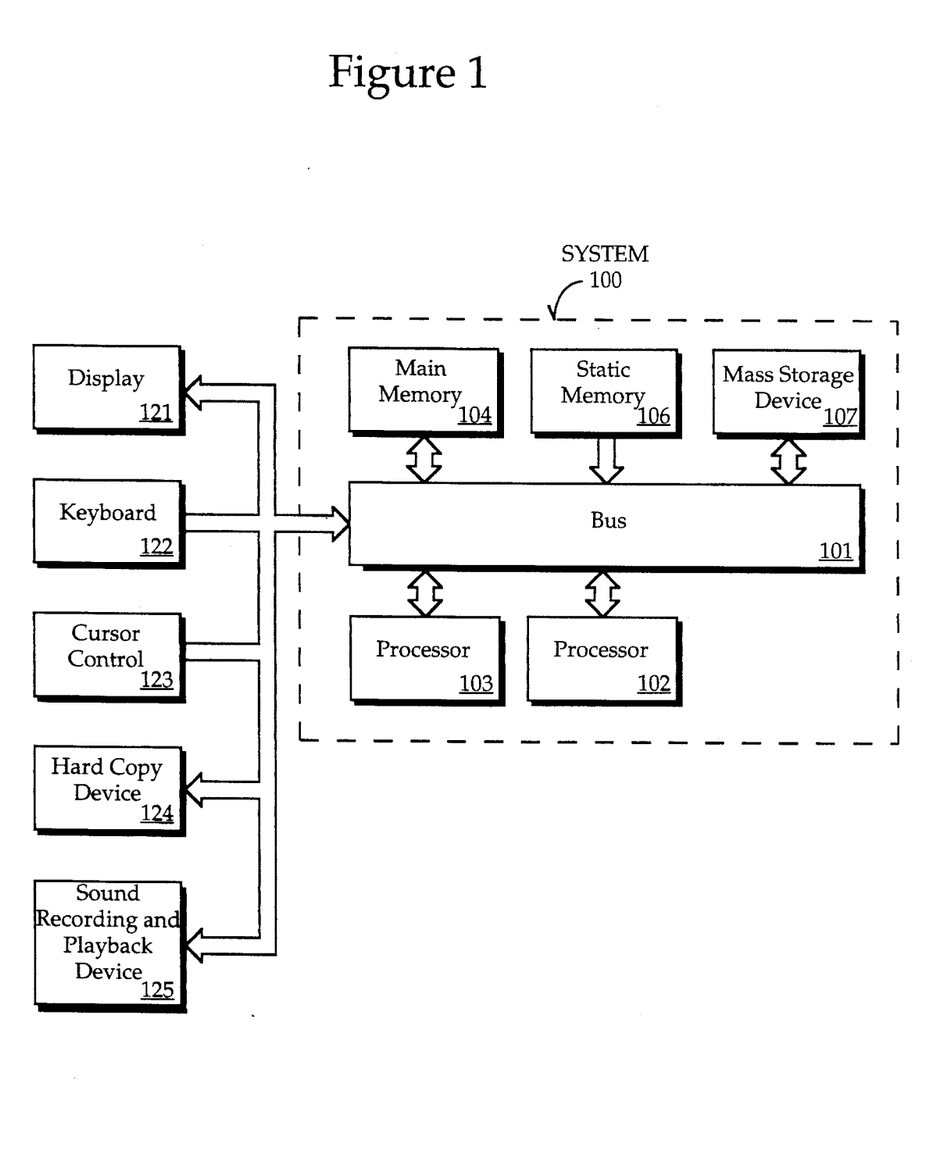
FIG. 1 shows the computer system upon which a preferred embodiment of the present invention is implemented.

Referring to FIG. 1, the computer system upon which a preferred embodiment of the present invention is implemented is shown as 100. Computer system 100 comprises a bus or other communication means 101 for communicating information, and a processing means 102 coupled with bus 101 for processing information. Processor 102 includes, but is not limited to microprocessors such as the Intel™ architecture microprocessors, PowerPC™, Alpha™, etc. Additional numbers of processors, such as processor 103, may also be coupled to bus 101. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102 and an IO bridge 108 to interface to an IO bus 120. A number of standard IO devices may in turn be interfaced to IO bus 120. Computer system 100 also comprises of a read only memory (ROM) 126 coupled to bus 101 for storing non-volatile information and instructions for processor 102, and a data storage device 127 such as a magnetic disk or optical disk and its corresponding disk drive. Data storage device 107 is coupled to bus 101 for storing information and instructions.

Computer system 100 may further be coupled to a display device 121, such as a cathode ray tube (CRT) or liquid crystal display (LCD) coupled to bus 120 for displaying information to a computer user. An alphanumeric input device 122, including alphanumeric and other keys, may also be coupled to bus 120 for communicating information and command selections to processor 102. An additional user input device is cursor control 123, such as a mouse, a trackball, stylus, or cursor direction keys, coupled to bus 120 for communicating direction information and command selections to processor 102, and for controlling cursor movement on display 121. Another device which may be coupled to bus 101 is hard copy device 124 which may be used for printing instructions, data, or other information on a medium such as paper, film, or similar types of media. Furthermore, a sound recording and playback device, such as a speaker and microphone may optionally be coupled to bus 120 for interfacing with computer system 100. Note that any or all of the components of system 100 and associated hardware may be used in a preferred embodiment, however, it can be appreciated that any type of configuration of the system may be used for various purposes as the user requires. Specifically in one approach IO bridge 108 may be eliminated allowing all devices to reside on bus 101.

Figure 2:
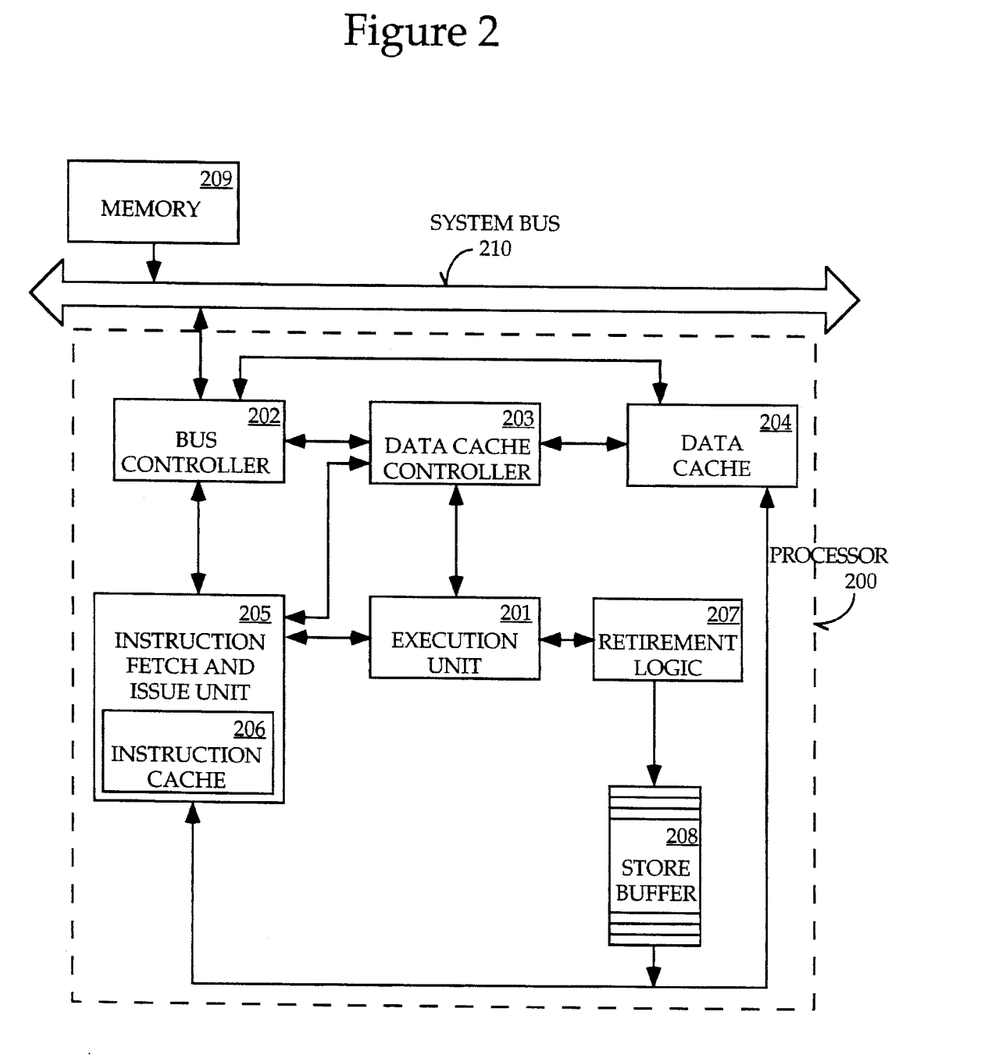
FIG. 2 is a block diagram illustrating an exemplary processor incorporating the teachings of the present invention.

Referring now to FIG. 2, a block diagram illustrating an exemplary processor 200 incorporating the teachings of the present invention is shown. The exemplary processor 200 comprises an execution unit 201, a bus controller 202, a data cache controller 203, a data cache 204, and an instruction fetch and issue unit 205 with an integrated instruction cache 206. The elements 201–206 are coupled to each other as illustrated. Together they cooperate to fetch, issue, execute, and save execution results of instructions in a pipelined manner.

The instruction fetch and issue unit 205 fetches instructions from instruction cache 206 and on a cache miss from an external memory through the bus controller 202 via an external system bus. Bus controller 202 manages transfers of data between external components and processor 200. In addition, it also manages cache coherency transfers. The instruction fetch and issue unit 205 then issues these instructions to the execution unit 201 in an in-order sequence. Basically, the execution unit 201 performs such functions as add, subtract, logical AND, and integer multiply. Some of these instructions are fetched and issued speculatively. The execution unit 201 holds and executes the integer and floating point instructions when their operand dependencies on execution results of preceding instructions are resolved. This includes those integer and floating point instructions that are speculatively fetched and issued. In similar fashion, the execution unit 201 holds and forwards the load and store instructions to the retirement logic 207.

Retirement logic 207 commits the states of these instructions to whatever permanent architectural state that was designated by the original source code. Load instruction execution requires data from the actual memory location. Hence loads are reared only after the data becomes available from the local buffers, caches or memory as necessary. However, store instruction execution does not have the limitation. As a result stores are retired immediately and thereupon the retired instructions are sent to store buffer 208. Store buffer 208 is a first-in-first-out (FIFO) structure for storing address, size, data, and other key attributes. The top pointer of the structure points to the store most recently retired. The bottom of store buffer 208 (i.e., the one containing the oldest retired store) is the only one ready to be written to a memory subsystem, such as data cache 204. The store buffer 208 is only visible to the processor core (e.g., execution unit 201 and instruction fetch, issue unit 205, and instruction cache 206). External snoops do not recognize the existence of the store.

Data cache controller 203 controls the access of data to/from the data cache 204. Data cache 204 is a fast, small, hardware-maintained scratchpad memory which can be reached in fewer clock cycles than main memory by loads and stores. The execution unit forwards lead instructions immediately to the data cache controller 203 and the data cache 204. This is because a lead instruction cannot retire until the data is available from the cache or memory subsystem. In contrast, store instructions are buffered. In other words, memory references are not necessarily forwarded in the order they were issued. Moreover, some memory lead references are forwarded due to speculative execution of instructions. In any case, the execution results of the integer, floating point, and lead instructions are buffered, and then retired or committed in order. In comparison, the buffered store instructions are retired or committed in order and then executed in the "background," at the convenience of the memory system. Speculative integer, floating point, and lead execution results and buffered stores of mis-predicted branches are purged.

The instruction fetch and execution unit 205 is intended to represent a broad category of instruction fetching and issuing elements found in many computer systems. Their constitutions and functions are well known and will not be further described. In the presently preferred embodiment, the instruction fetch and issue unit 205 includes an instruction cache 206. The instruction cache 206 is a fast local memory that holds the instructions to be executed. When a program attempts to access an instruction that is not yet or no longer in the cache, the processor must wait until hardware fetches the desired instructions from another cache or memory downstream. It is the responsibility of the instruction fetch and issue unit 205 to decide which instruction cache entry ought to be accessed next for maximal program performance. In the currently preferred embodiment, the instruction cache 206 and data cache 204 exists in a memory hierarchy.

The hierarchy is comprised of a small but extremely fast L1 cache. If a memory access to the L1 cache results in a miss, the access is passed on to a bigger, but slower, L2 cache. And if that also results in a miss, the memory access goes to the L3 cache or to the main memory if the processor happens to not have an L3 cache. The data cache controller 203 is used for page miss handling. Furthermore, there is no requirement for the instructions to be fetched from aligned memory locations. In other words, an instruction may be fetched from memory locations spanning two cache lines. However, it will be appreciated that the present invention may be practiced with or without an instruction cache, or with a combined instruction/data cache. If an instruction cache is implemented, page misses may be handled by a dedicated page miss handler, and instructions may be fetched from aligned memory locations.

In the currently preferred embodiment, instruction cache 206 is a read only cache. Writes to cache 206 are rare. They need to be correctly handled but are not performance critical. The data cache 204, and cache controller 203 utilize a writeback configuration with M.E.S.I. protocol. The M.E.S.I. (Modified, Exclusive, Shared, or Invalid) protocol depends upon having a shared system bus 210. Furthermore, cache controller 203 must have the ability to: use the same line size for all caches on the memory bus; observe all memory bus activity; maintain state information about every line of cache memory; and take appropriate action to maintain consistency. The M.E.S.I. protocol is implemented by assigning state bits for each cached line. These states are dependent upon both data transfer activities performed by the local processor as the bus master, and snooping activities performed in response to transactions generated by other bus masters.

M.E.S.I. represents 4 states. They define whether a line is valid (i.e., hit or miss), if it is available in other caches (i.e., shared or exclusive), and if it is modified (i.e., has been modified). The four states are defined as follows:

[M]—MODIFIED This state indicates a line which is exclusively available in only this cache (all other caches are I), and is modified (i.e., main memory's copy is stale). A Modified line can be read or updated locally in the cache without acquiring the memory bus. Because a Modified line is the only up-to-date copy of data, it is the cache controller's responsibility to writeback this data to memory on snoop accesses to it.

[E]—EXCLUSIVE Indicates a line which is exclusively available in only this cache (all other caches are I), and that this line is not modified (main memory also has a valid copy). Writing to an Exclusive line causes it to change to the Modified state and can be done without informing other caches or memory, so no memory bus activity is generated. On a snoop to E state it is the responsibility of the memory to provide data.

[S]—SHARED Indicates that this line is potentially shared with other caches. The same line may exist in one or more other caches (main memory also has a valid copy). A Shared line can be read by the CPU without a main memory access. Writing to a Shared line may use two policies. Using no write allocate policy a write updates the cache, and also requires the cache controller to generate a write-through cycle to the memory bus. In addition to updating main memory, the write-through cycle will invalidate this line in other caches. Using write allocate policy a write generates an invalidation request transaction on the memory bus. This will invalidate the line in other caches and allow the local cache to be updated and change to modified state. Main memory is not updated.

[I]—INVALID Indicates that the line is not available in the cache. A read to this cache line will be a miss and cause the cache controller to execute a line fill (i.e., fetch the entire line and deposit it into the cache SRAM). A write to this cache line may use two policies. In no write allocate policy a write will cause the cache controller to execute a write-through cycle to the memory bus. In write allocate policy a read for ownership bus transaction is executed and the line is brought in the cache in ownership state. After that the line is written with updated data and its state is changed to modified.

The states determine the actions of the cache controller with regard to activity related to a line, and the state of a line may change due to those actions. All transactions which may require state changes in other caches are broadcast on the shared memory bus.

In a writeback configuration, cache 204 is designed to minimize the mount of reads and writes to main system memory 209. These caches have tags that include a bit called the modified dirty (altered) bit. This bit is set if a cache location has been updated with new information and therefore contains information that is more recent than the corresponding information in main system memory 209.

From the description of cache states to follow, it should be clear that only the stores to "E" or "M" states do not generate a bus transaction, and after the store is completed the final cache state is "M". If the same processor reads the same location it will always be guaranteed the updated data by the cache controller. If any other processor read the location the new processor can never find it in its own cache and hence, will always need to generate a bus transaction. During the snoop request corresponding to the bus transaction, the cache controller containing the data in modified state will intervene and return the updated cache line. Due to the fact that data from a given memory location can reside simultaneously in main memory 209 and in one or more cache memories 204 and 20S, and also the data in one cache may have a value different from that in memory because one has been updated more recently, M.E.S.I. ensures that all references to a main-memory location retrieve the most recent value.

Figure 3:
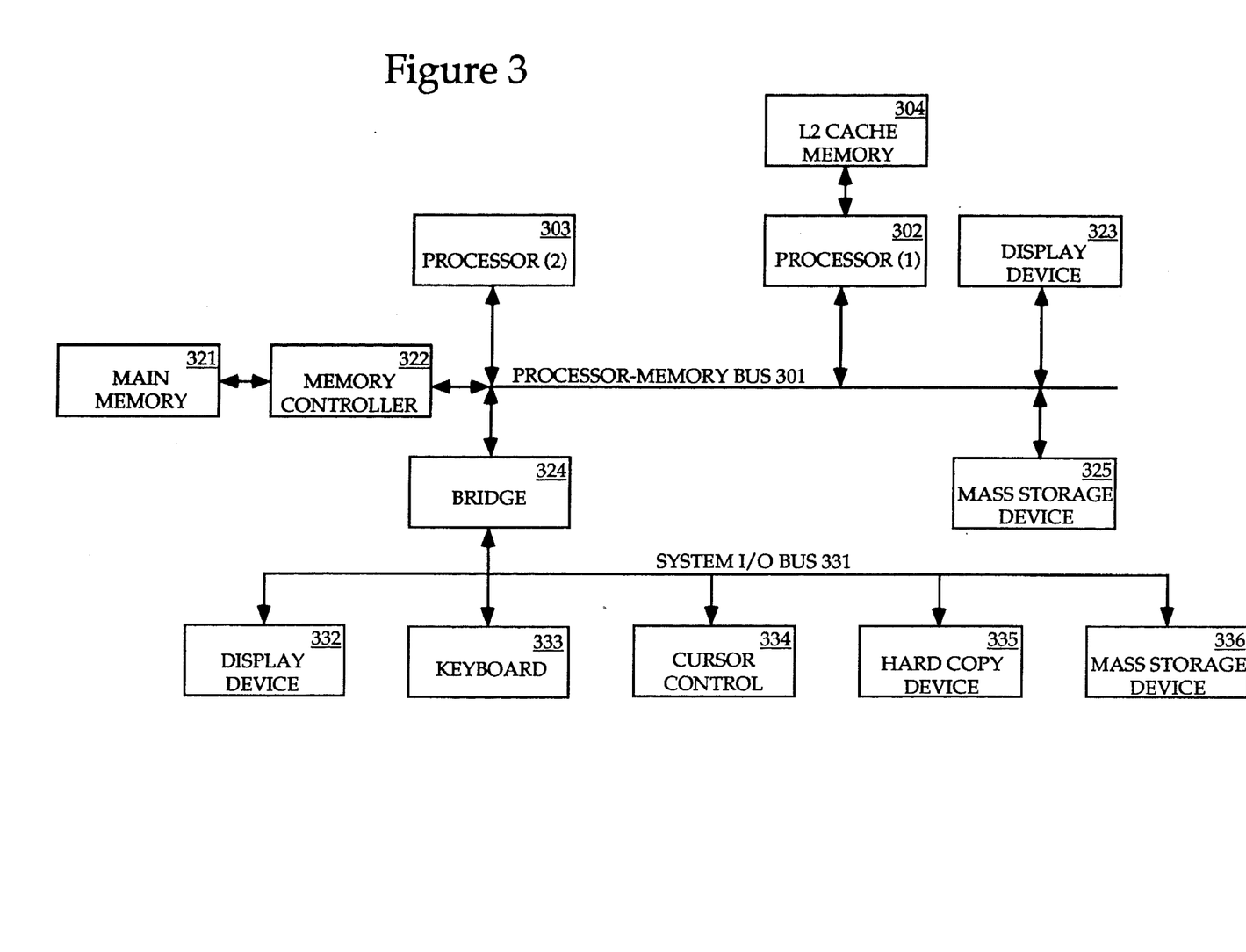
FIG. 3 shows an overview of a multi-processor computer system upon which the present invention may be practiced.

FIG. 3 shows an overview of a multiprocessor computer system upon which the present invention may be practiced. The computer system generally comprises a processor-system bus or other communication means 301 for communicating information between one or more processors 302 and 303. Processors 302 and 303 can be of a form as shown in FIG. 1. Processor-system bus 301 includes address, data and control buses. As described above, processors 302 and 303 may include a small, extremely fast internal cache memory, commonly referred to as a level one (L1) cache memory for temporarily storing data and instructions on-chip. In addition, a bigger, slower level two (12) cache memory 304 can be coupled to processor 302 for temporarily storing data and instructions for use by processor 302. In the currently preferred embodiment, the L1 and L2 cache memories are included in the same chip package as processor 302.

Also coupled to processor-memory bus 301 is processor 303 for processing information in conjunction with processor 302. Processor 303 may comprise a parallel processor, such as a processor similar to or the same as processor 302. Alternatively, processor 303 may comprise a co-processor, such as a digital signal processor. The processor-memory bus 301 provides system access to the memory and input/output (I/O) subsystems. A memory controller 322 is coupled with processor-memory bus 301 for controlling access to a random access memory (RAM) or other dynamic storage device 321 (commonly referred to as a main memory) for storing information and instructions for processor 302 and processor 303. Memory controller 312 maintains a strong order of read and write operations. A mass data storage device 325, such as a magnetic disk and disk drive, for storing information and instructions, and a display device 323, such as a cathode ray tube (CRT), liquid crystal display (LCD), etc., for displaying information to the computer user are coupled to processor memory bus 301.

An input/output (I/O) bridge 324 is coupled to processor memory bus 301 and system I/O bus 331 to provide a communication path or gateway for devices on either processor memory bus 301 or I/O bus 331 to access or transfer data between devices on the other bus. Essentially, bridge 324 is an interface between the system I/O bus 33 1 and the processor memory bus 301.

In order to reduce the bandwidth requirement, bridge 324 turns the byte/word/dword data transfer traffic from I/O bus 331 into line size traffic on processor memory bus 301. I/O bus 331 communicates information between peripheral devices in the computer system. Devices that may be coupled to system bus 331 include a display device 332, such as a cathode ray tube, liquid crystal display, etc., an alphanumeric input device 333 including alphanumeric and other keys, etc., for communicating information and command selections to other devices in the computer system (e.g., processor 302) and a cursor control device 334 for controlling cursor movement. Moreover, a hard copy device 335, such as a plotter or printer, for providing a visual representation of the computer images and a mass storage device 336, such as a magnetic disk and disk drive, for storing information and instructions may also be coupled to system bus 331. In some implementations, it may not be required to provide a display device for displaying information. Certain implementations of the present invention may include additional processors or other components.

Figure 4:
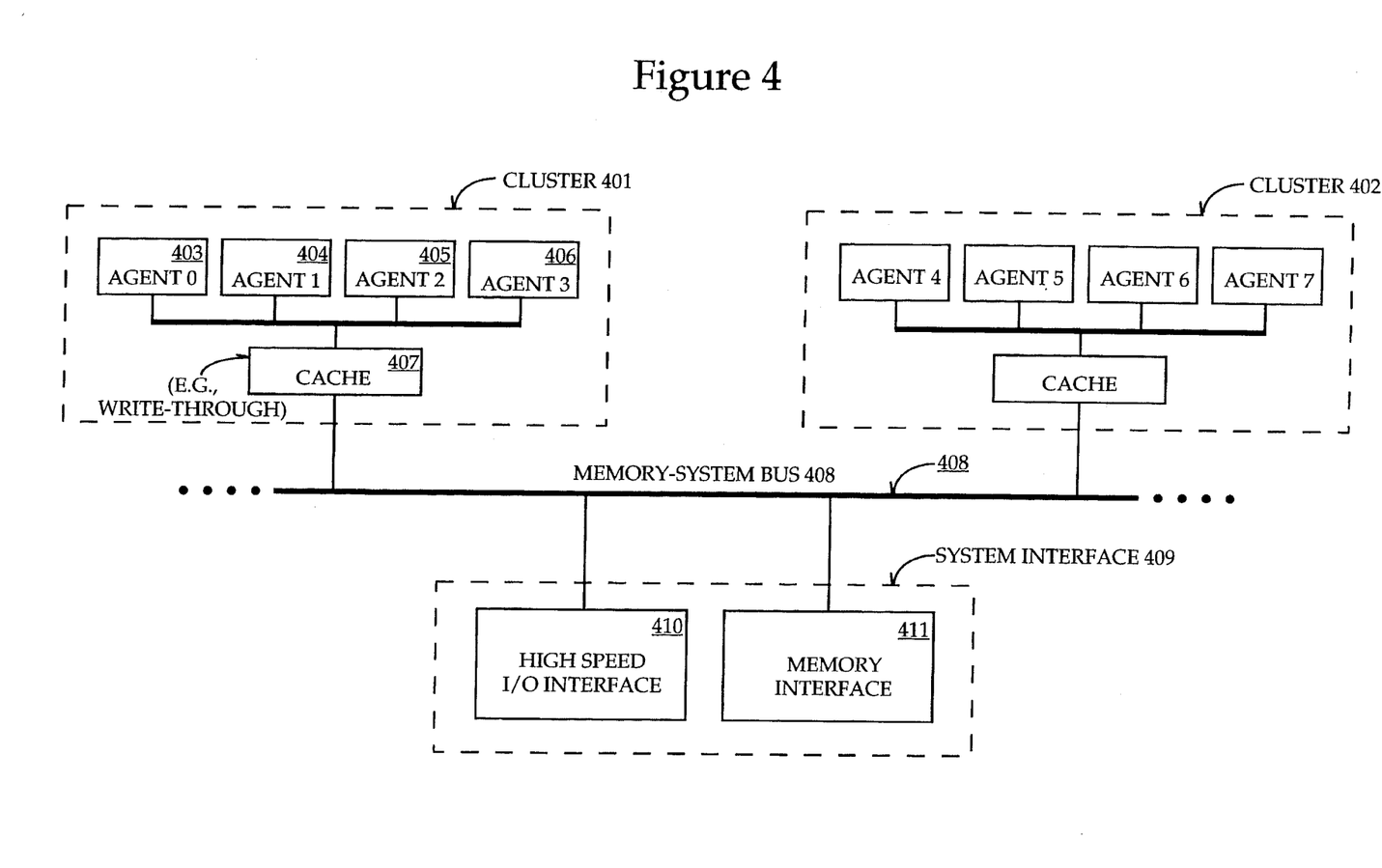
FIG. 4 is a block diagram showing a bus cluster system upon which the present invention may be practiced.

FIG. 4 is a block diagram showing a bus cluster system upon which the present invention may be practiced. The present invention can apply to multiprocessor computer systems having one or more clusters of processors. FIG. 4 shows two such clusters 401 and 402. Each of these clusters are comprised of a number of processors. For example, cluster 401 is comprised of four agents 403–406 and a cache 407. Agents 403–406 can include microprocessors, co-processors, digital signal processors, etc. Cache 407 is shared between these four agents 403–406. Each cluster is coupled to a memory system bus 408. These clusters 401–402 are coupled to various other components of the computer system through a system interface 409. The system interface 409 includes a high speed I/O interface 410 for interfacing the computer system to the outside world and a memory interface 411 which provides access to a main memory, such as a DRAM memory array (these interfaces are described in greater detail in FIG. 3).

In the currently preferred embodiment of the present invention, a processor writes to a cache line in the Exclusive or Modified state line immediately. The final state is then changed to that of Modified. When a processor writes to a line in the Invalid or Shared state, it has two options. First, in a Write-through approach, a write miss creates a partial write transaction from the agent writing the data. If the processor contains the data in the Invalid state, the caches are not affected. When the transaction runs on the bus, all snooping caches are invalidated. If the processor contains the data in a Shared state, a cache write-through operation is performed, and the partial write transaction is sent on the bus. The partial write invalidates the line in other snooping caches. On successful completion of the transaction, the original agent goes to the Exclusive state and subsequently begins updating the cache internally. When multiple write-back agents perform a write transaction to the same cache line, only the data in the main memory contains valid data because if each agent performs a write-through, there are two copies of the line in the Shared state that contain different data. Hence, the lines inside the respective caches are invalidated.

In the second approach, a write-allocation operation is performed. When the line is in an Invalid state, the processor performs a Bus-Read-Invalidate transaction. A Bus-Read-Invalidate transaction indicates that a requesting processor has had a read miss and intends to modify that cache line when the line is returned. This transaction invalidates the cache line in all other caches and brings the line back to the Exclusive state in the requesting processor. If the line is in the Shared state, the processor performs a bus-write-invalidation transaction. A bus-write-invalidation transaction indicates that a requesting processor contains the cache line in the shared state and intends to modify the line. In the case of a race condition, the response to this transaction may contain data. This bus-write-invalidation transaction invalidates the cache line in all other caches and all the Shared states to go to the Exclusive state in the requesting processor. Only after the Exclusive state has been updated, is the processor allowed to update its cache date and upgrade itself to the Modified state. Note that since the data update does not happen until the processor is in the Exclusive state, it is assured that only one processor will be updating the cache data at any given time.

When two processors on the same cluster initiate a Bus-Write-Invalidate transaction at the same time, it is necessary to resolve the race condition. In one embodiment, the present invention resolves race conditions by NACKing the second write invalidation request while the first invalidation request is progressing. This embodiment requires the second agent to reissue its request. The NACK may either be generated by the first agent or by the memory controller responsible for handling the bus transaction in the absence of the race condition.

In currently preferred embodiment, both invalidation requests are allowed to continue on the bus. However, only the first invalidation request that first appeared on the bus is simply allowed to complete with no need of a data transfer. Thereupon, the first processor goes to the Exclusive state, updates the cache line, and then goes to the Modified state. Upon observing the second invalidation request, the first processor asserts the snoop results indicating that it contains the line in a Modified state. This requires the transaction completion to be altered and it includes a data transfer phase. (Note that the second processor contained the line in Shared State and was not expecting any data.) During the data transfer phase the first processor writes back the notified cache line on the bus and then goes to the Invalid state. The second processor which normally expects a completion response to a bus-invalidation request, now receives a new cache line. The second processor updates its cache to the new cache line and then goes to the Exclusive state. Thereupon, the second processor can write its data to the Exclusive state line and change to the Modified state. Note that this approach can be readily applied if all processors generated invalidation requests on the same bus cluster. The ownership of the cache line is passed from one processor to the next processor.

In an alternative embodiment, instead of issuing the second invalidation transaction, the second processor observes the first bus-write-invalidation transaction. The second processor then assures that it never issues a write-invalidation transaction to the same line. Instead, the second processor converts it to a read-invalidation request and sets the internal state of the line to the Invalid state. However, this alternative embodiment introduces an additional delay in the critical timing path associated with issuing write-invalidation requests on the bus.

A different race condition exists when the first processor issues a partial memory write to the same cache line that the second processor is about to issue a bus-write-invalidation request. The second processor always issues a bus-read-invalidation request instead of the bus-write-invalidation request. This requires memory 222 to return the new line. This is the preferred embodiment.

However, the race condition may also be handled by the memory controller when it detects a partial write transaction followed by a bus-write-invalidation request to the same cache line. In such a case the memory controller may assert a modified line indication during the snoop result phase of the second invalidation transaction and then return the modified line during the data transfer phase of the transaction.

The present invention is applicable to multiple cluster, each of which contains write-back caches. The same approach described above is applied to multiple cluster applications. Two or more processors from different clusters initiate bus-write-invalidation requests to the same cache line. The memory controllers in both clusters assert a snoop result indicating that the ownership of the line is not immediately available. Next, the memory controllers access the system interconnect network. This interconnection can be made through a common bus that may have a different topology. It is given that one of the memory controllers will gain access first. This allows the first transaction to be ready for completion. Thereby, the first memory controller informs the first processor by running a deferred reply with normal completion response. This allows the first processor to upgrade to the Exclusive state, update its cache line, and then go to the Modified state.

When the second memory controller issues its request to the interconnect (e.g., the system bus), it is handled in the presence of a line in the Modified state in a different cluster. As a result, a backward invalidation is first sent to the first cluster/processor to invalidate the line from the processor and to obtain the write-back cache line. This line now contains the updated data. Next, a deferred reply is sent back by the second memory controller to the second processor. During the data phase of the deferred reply, the memory controller returns the new cache line. When the processor obtains a deferred reply with data, it absorbs the cache line in its cache and goes to the Exclusive state. Now, it updates the cache line and changes it to the Modified state. Note that since there is no need to NACK any transaction, there is no possibility of repeated retries and, hence, no resulting livelock scenarios.

Similarly if the first processor from cluster 1 issued a partial write that completes successfully, the second memory controller is required to convert its bus-write-invalidation request to a bus-read-invalidation request to obtain the new data from the memory interface 411.

Figure 5A:
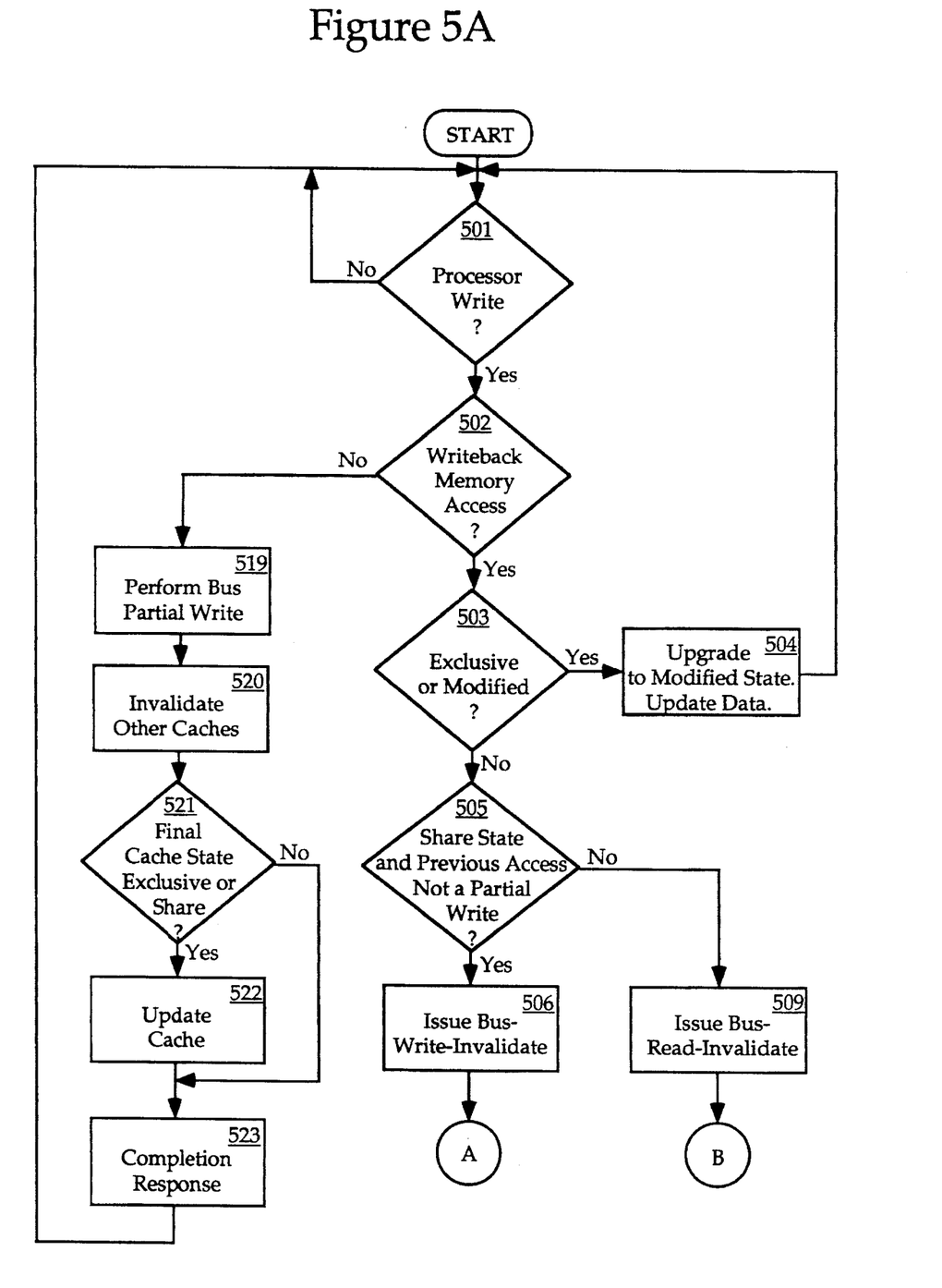
FIGS. 5A–C show a flowchart describing the steps for performing write operations in the currently preferred embodiment of the present invention.
Figure 5B:
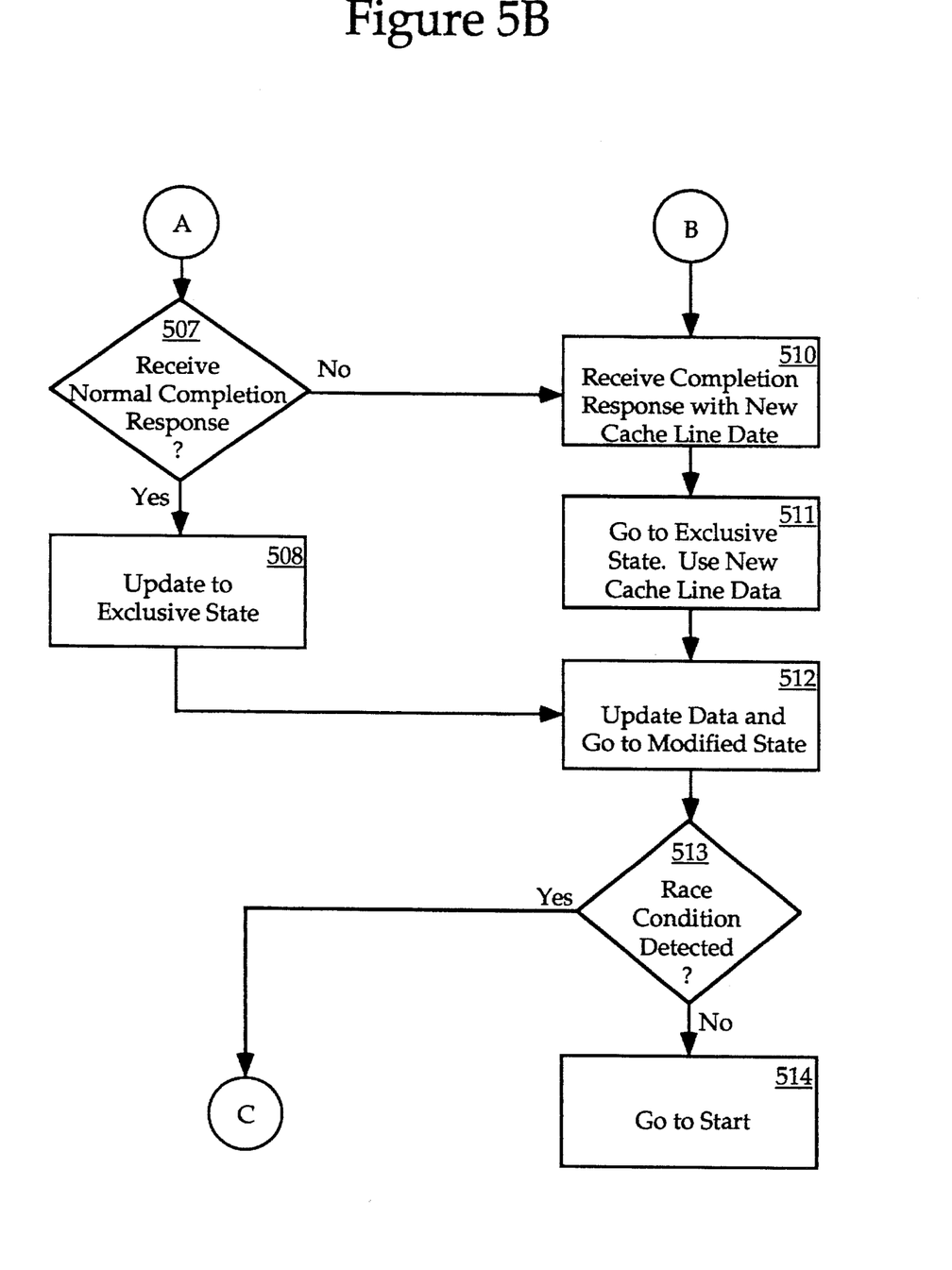
Figure 5C:
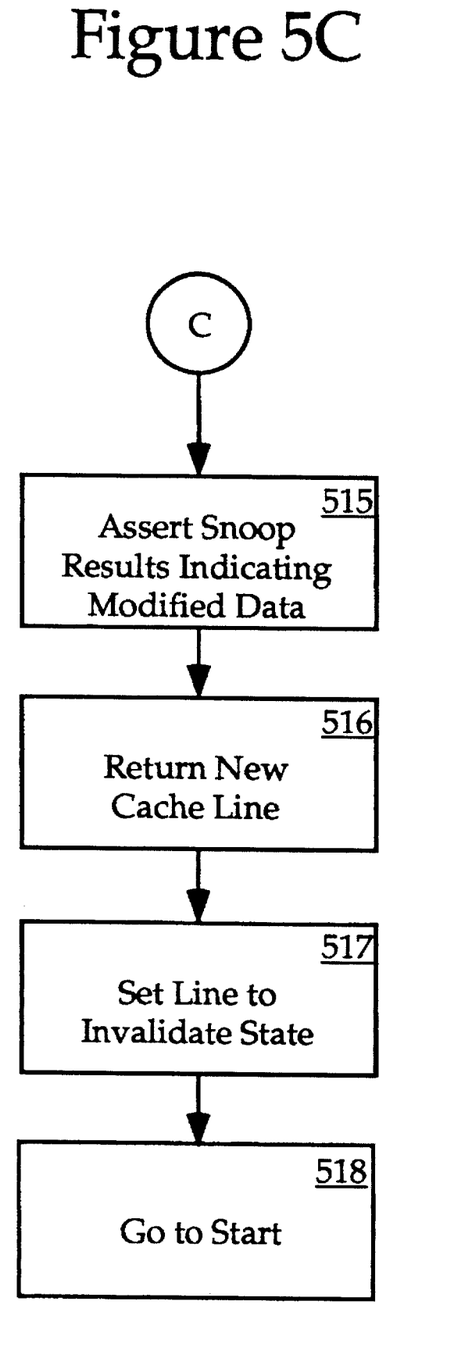

FIGS. 5A–C show a flowchart describing the steps for performing write operations in the currently preferred embodiment of the present invention. Initially, a determination is made as to whether the processor has initiated a write operation, step 501. If a write operation has not been initiated, the processor continuously monitors for the next write operation. Otherwise, when a write operation is detected, a determination is made as to whether the write operation results in a writeback memory access, step 502. If the write operation results in a writeback memory access, a determination is made as to whether that memory access is in the Exclusive or Modified State, step 503. If the state happens to be Exclusive or Modified, the data is updated and the state is upgraded to that of Modified, step 504. Thereupon, step 501 is repeated. Otherwise, a determination is made in step 505 as to whether the state is Shared and the previous access was not a partial write. If so, steps 506–608 are performed. Otherwise, steps 509–512 are performed.

In step 506, a Bus-Write-Invalidate command is issued. A determination is then made as to whether a normal completion response was received, step 507. If a normal completion response was not received, step 510 is performed. Note that this path is taken due to the race condition existing between two invalidation requests. If, however, a normal completion response was received, the state is updated to Exclusive, step 508. The flow then progresses to step 512.

In step 509, a Bus-Read-Invalidate command is issued. A completion response with new cache line data is received, step 510. The state is set to Exclusive, and the new cache line data is used, step 511. The data is then updated and the state is set to Modified, step 512.

In step 513, a determination is made as to whether a race condition has been detected. If there is no race condition, the flow progresses back to step 501. Otherwise, if a race condition is detected, steps 515–518 are performed. In step 515, snoop results indicating modified data are asserted. The new cache line is returned, step 516. The cache line is then set to the Invalid State, step 517. Thereupon, the flow progresses back to step 501.

If it were determined in step 502 that a writeback memory access was not requested, steps 519–523 are performed. In step 519, a bus partial write operation is performed. All other caches are then invalidated, step 520. Next, a determination is made as to whether the final cache state is Exclusive or Shared, step 521. If the final cache state is Exclusive or Shared, the cache is updated, step 522. Otherwise, step 522 is skipped. In step 523, the completion response is performed. The flow then repeats step 501.

Figure 6:
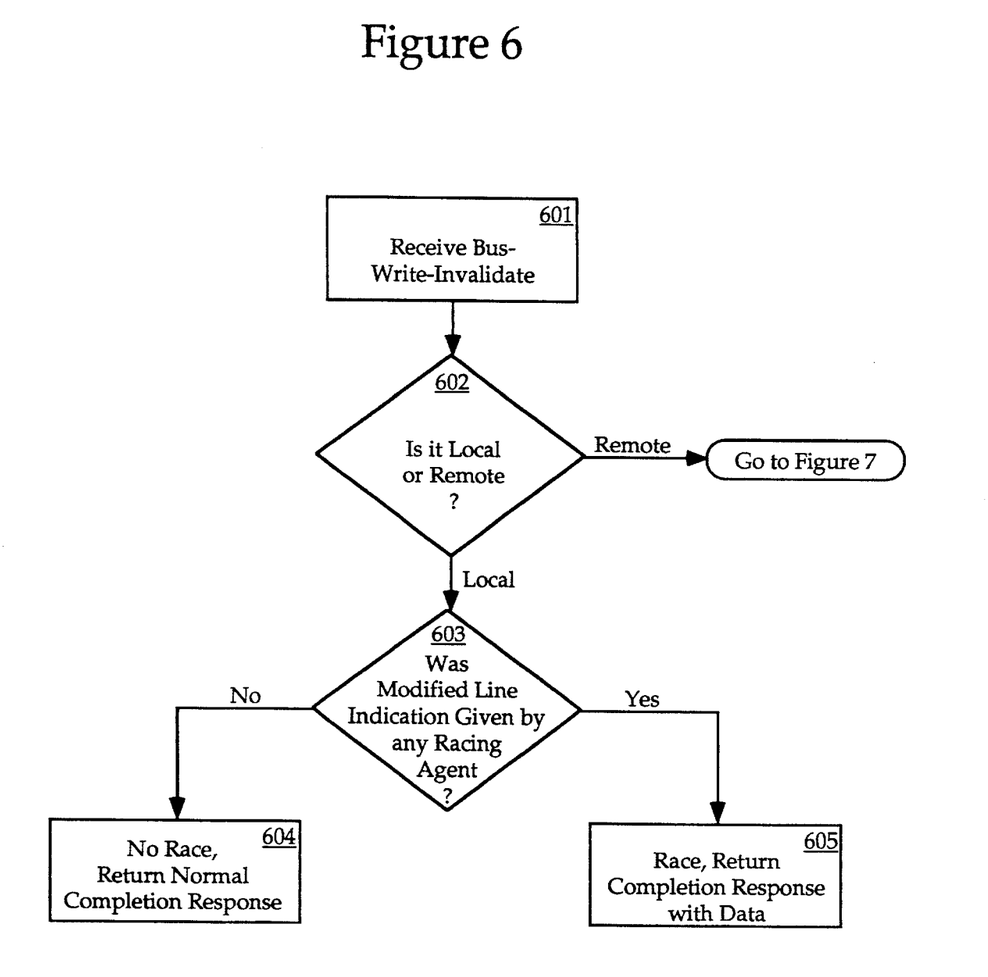
FIG. 6 shows a flowchart describing the steps for resolving race conditions, in a single cluster environment.

FIG. 6 shows a flowchart describing the steps for resolving race conditions in a single cluster environment. Initially, the cluster/memory controller receives a Bus-Write-Invalidate operation, step 601. Next, a determination is made as to whether the Bus-Write-Invalidate operation is local or remote, step 602. For a local request, a determination is made as to whether the modified line indication was given by any racing agent, step 603. If there is no race condition indicated, the normal completion response is returned, step 604. Otherwise, for a race indication, the completion response is returned with data, step 605.

Figure 7:
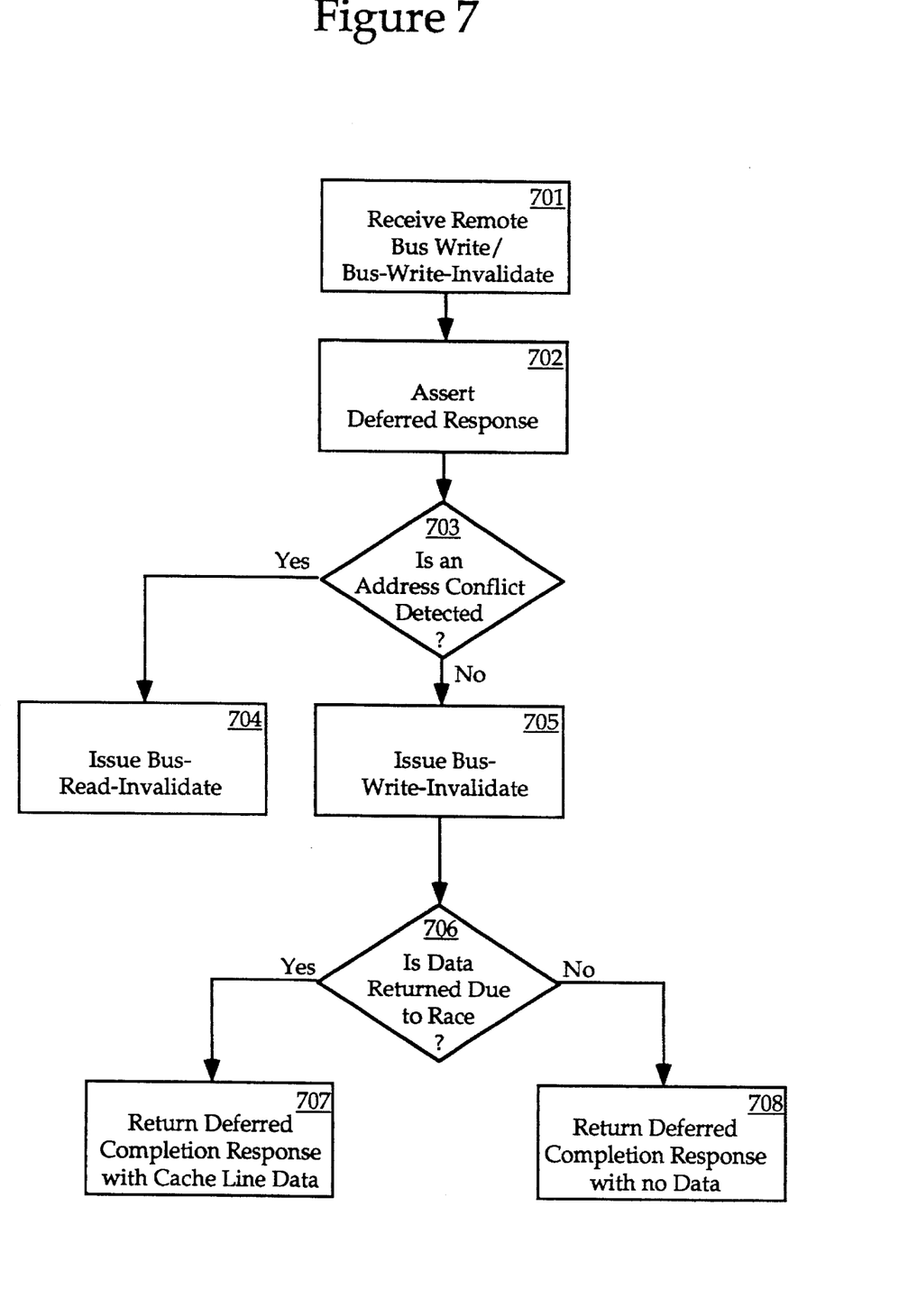
FIG. 7 shows a flowchart describing the steps for resolving race conditions for processors belonging to different bus clusters.

FIG. 7 shows a flowchart describing the steps for resolving race conditions for processors belonging to different bus clusters. When a remote request or a Bus-Write-Invalidate operation is received, in step 701, a deferred response is asserted, step 702. Next, a determination is made as to whether an address conflict is detected, step 703. If an address conflict was detected, a Bus-Read-Invalidate operation is issued, step 704. Otherwise, if there was not an address conflict, a Bus-write-Invalidate command is issued, step 705. In step 706, a determination is made as to whether the returned data results in a race condition, step 706. If so, a deferred completion response is returned with the cache line data, step 707. Otherwise, the deferred completion response is returned with no data, step 708.

Thus, an apparatus and method for handling race conditions in a multi-processor system is disclosed.

What is claimed is:

1. A method of handling race conditions in a MESI-based multiprocessor (MP) system having a plurality of processors coupled to a pipelined bus comprising the steps of:

(a) initiating by a first processor, a first request on the pipelined bus directed to a cache line in a shared state, the first request being a write operation;

(b) initiating, by a second processor, a second request on the pipelined bus directed to the cache line, the second request also being a write operation and being issued such that a race condition occurs between the first and second requests;

(c) writing data to the cache line in accordance with the first request initiated by the first processor, the cache line being changed to a modified state;

(d) changing, by the second processor, the second request into a read operation;

(e) reading data from the cache line by the second processor, the cache line being changed to a shared state.

2. The method of claim 1 further comprising the step of:

updating a main memory with the data written to the cache line by the first processor.

3. The method of claim 1 wherein the first request is initiated in a first clock cycle of the MP system and the second request is initiated in a second clock cycle.

4. The method of claim 1 further comprising the step, prior to step (d), of:

detecting, by the second processor, the race condition.

5. The method of claims 1, 2, 3 or 4 wherein the MP system is organized to have a first cluster comprising a first memory controller and a first set of agents coupled to a first shared bus, the first set of agents including the first processor, and a second cluster comprising a second memory controller and a second set of agents coupled to a second shared bus, the second set of agents including the second processor, the first and second shared buses being coupled to the pipelined bus, and wherein the method further comprises the steps of:

asserting a snoop result, by each of the first and second memory controllers, indicating that ownership of the cache line is unavailable;

accessing, by the first memory controller, a system interconnect network which couples the pipelined bus to the main memory;

running, by the first memory controller, a deferred reply that informs the first processor that the write transaction of the first request has completed;

sending a deferred reply to the second processor along with updated data.

6. A MESI-based multiprocessor (MP) computer system for handling race conditions comprising:

a pipelined bus;

a first processor coupled to said pipelined bus, said first processor having a first cache;

a second processor coupled to said pipelined bus, said second processor having a second cache;

a first memory controller for controlling said first cache;

a second memory controller coupled to said first memory controller via said pipelined bus, said second memory controller for controlling said second cache, said first and said second memory controllers determining an existing state of a cache line;

a first logic coupled to said first memory controller for writing to said cache line and changing said existing state of said cache line to a modified state if said existing state of said cache line is an Exclusive state;

a second logic coupled to said first memory controller for performing a Bus-Read-Invalidate operation if said existing state of said cache line is an Invalid state and allowing an invalidation request corresponding to said first processor to complete if said existing state of said cache line is a Shared state and said first processor and said second processor both initiate Bus-Write-Invalidate operations;

a third logic coupled to said first processor for setting said cache line to said Exclusive state, updating data to said cache line, and setting said cache line to said Modified state;

a fourth logic coupled to said second processor for receiving a second cache line, updating said second cache line, setting said second cache line to said Exclusive state, writing said data to said second cache line in said Exclusive state, and setting said second cache line to said Modified state.

7. The MP computer system of claim 6, wherein said second processor belongs to a different bus cluster.

8. The MP computer system of claim 7, wherein said first processor and said second processor assert a snoop response and access a system interconnect network coupling said first processor to said second processor to allow a first bus-write-invalidation operation to complete and wherein said first processor sets said cache line to said Exclusive state, updates said cache line in said Exclusive state, and updates said cache line to said Modified state.

9. The MP computer system of claim 8, wherein said second processor invalidates said cache line associated with said first processor, receives a third cache line, sets said third cache line to said Exclusive state, updates said third cache line, and sets said third cache line to said Modified state.

10. The MP computer system of claim 6 wherein said first and second caches comprise of write-through caches and all snooping caches are invalidated if said cache line is in said Invalid state and wherein said second memory controller performs a partial write operation, invalidate all snooping caches, sets said cache line to said Exclusive state, and updates said cache line if said cache line is in said Shared state.

11. The MP computer system of claim 6 further comprising a third processor coupled to said second processor via said pipelined bus, said third processor generating another invalidation request.

12. The MP computer system of claim 11 further comprising a fifth logic coupled to said third processor for getting ownership of said cache line, wherein said third processor updates a fourth cache line, sets said fourth cache line to said Exclusive state, writes data to said fourth cache line and sets said fourth cache line to said Modified state.

13. The MP computer system claim 6 further comprising logic to issue a read-invalidation request following a first bus-write-invalidation operation.

14. A MESI-based multiprocessor (MP) computer system having a plurality of processors coupled to a pipeline system bus, each processor having internal cached memory means, an apparatus for handling race conditions wherein a first processor means and a second processor of said plurality of processors both write to a particular cache line, said apparatus comprising:

a first controller means coupled to said first cached memory means for controlling said first cached memory means;

a second controller means coupled to said first controller means for controlling a second cached memory means;

means for writing to said cache line such that said cache line is in a Modified state;

means for performing a Bus-Read-Invalidate operation if said cache line is in an Invalid state;

means for allowing an invalidation request corresponding to said first processor to complete if said cache line is in a Shared state and said first processor and said second processor both initiate Bus-Write-Invalidate operations;

means for setting said cache line to an Exclusive state, updating data to said cache line, and setting said cache line to said Modified state;

means for receiving a second cache line, updating said second cache line, setting said second cache line to said Exclusive state, writing said data to said second cache line, and setting said second cache line to said Modified state.

15. The MP computer system of claim 14, wherein said second processor is coupled to a different bus cluster.

16. The MP computer system of claim 15, wherein said first processor and said second processor assert a snoop response and access a system interconnect network to allow a first bus-write-invalidation operation to complete and wherein said first processor sets said cache line to said Exclusive state, updates data in said cache line in said Exclusive state, and changes said cache line to said Modified state.

17. The MP computer system of claim 16, wherein said second processor invalidates said cache line associated with said first processor, receives a third cache line, sets said third cache line to said Exclusive state, updates data in said third cache line, and changes said third cache line to said Modified state.

18. The MP computer system of claim 14 wherein said cached memory means include write-through cached memory means.

19. The MP computer system of claim 18, wherein snooping caches are invalidated if said cache line is in said Invalid state and wherein said second controller means performs a partial write operation, invalidates all snooping caches, sets said cache line to said Exclusive state, and updates data in said cache line if said cache line is in said Shared state.

20. The MP computer system of claim 14 further comprising a third processor coupled to said second processor via said pipelined system bus for generating another invalidation request.

21. The MP computer system of claim 20 further comprising means for getting ownership of said cache line, wherein said third processor receives a third cache line, sets said third cache line to said Exclusive state, updates data in said third cache line and changes said third cache line to said Modified state.

22. The MP computer system of claim 14 further comprising means for issuing a read-invalidation request so that said cache line is set to said Invalid state following said first bus-write-invalidation operation.

* * * * *

UNITED STATES PATENT AND TRADEMARK OFFICE
CERTIFICATE OF CORRECTION

PATENT NO.    : 5,551,005                   Page 1 of 2
DATED         : August 27, 1996
INVENTOR(S)   : Sarangdhar et al.

It is certified that error appears in the above-identified patent and that said Letters Patent is hereby corrected as shown below:

In column 1 at line 51 delete "mount" and insert --amount--

In column 3 at line 47 delete "goes;" and insert --goes--

In column 6 at line 7 delete "reared" and insert --retired--

In column 6 at line 26 delete "lead" and insert --load--

In column 6 at line 28 delete "lead" and insert --load--

In column 6 at line 32 delete "lead" and insert --load--

In column 6 at line 35 delete "lead" and insert --load--

In column 6 at line 39 delete "lead" and insert --load--

In column 8 at line 12 delete "mount" and insert --amount--

In column 8 at line 31 delete "20S" and insert --205--

In column 14 at line 54 delete "pipeline" and insert --pipelined--

UNITED STATES PATENT AND TRADEMARK OFFICE
CERTIFICATE OF CORRECTION

PATENT NO. : 5,551,005
DATED : August 27, 1996
INVENTOR(S) : Sarangdhar et al.

It is certified that error appears in the above-indentified patent and that said Letters Patent is hereby corrected as shown below:

Column 14, line 60, delete "said" and insert --a--

Signed and Sealed this

Twelfth Day of November, 1996

BRUCE LEHMAN

Attest:

Attesting Officer

Commissioner of Patents and Trademarks